United States Patent
Johnson et al.

(10) Patent No.: US 6,597,851 B2
(45) Date of Patent: Jul. 22, 2003

(54) PERIODIC DIELECTRIC STRUCTURE HAVING A COMPLETE THREE-DIMENSIONAL PHOTONIC BAND GAP

(75) Inventors: Steven G. Johnson, St. Charles, IL (US); Michelle L. Povinelli, Somerville, MA (US); John D. Joannopoulos, Belmont, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 09/922,830

(22) Filed: Aug. 6, 2001

(65) Prior Publication Data

US 2002/0041749 A1 Apr. 11, 2002

Related U.S. Application Data

(60) Provisional application No. 60/224,049, filed on Aug. 9, 2000.

(51) Int. Cl.$^7$ ................................................. G02B 6/10
(52) U.S. Cl. ........................... 385/131; 359/332; 257/21
(58) Field of Search ........................ 385/131; 257/17, 257/21; 359/332; 372/19

(56) References Cited

U.S. PATENT DOCUMENTS

| | | | |
|---|---|---|---|
| 5,385,114 A | | 1/1995 | Milstein et al. |
| 5,406,573 A | * | 4/1995 | Ozbay ........................ 372/43 |
| 5,600,483 A | * | 2/1997 | Fan ............................ 359/344 |
| 5,998,298 A | * | 12/1999 | Fleming ..................... 438/692 |
| 6,274,293 B1 | | 8/2001 | Gupta et al. |
| 6,358,854 B1 | * | 3/2002 | Fleming ..................... 438/692 |
| 2001/0019037 A1 | | 9/2001 | Zakhidov et al. |
| 2001/0026857 A1 | | 10/2001 | Kinoshita |
| 2001/0042944 A1 | | 11/2001 | Ukechi et al. |

FOREIGN PATENT DOCUMENTS

| | | |
|---|---|---|
| EP | 1052529 A1 | 11/2000 |
| JP | 2000341031 A | 12/2000 |

OTHER PUBLICATIONS

A.L.Reynolds, and J.M.Arnold, "Interleaving two–dimensional lattices to create three–dimensional photonic bandgap structures", IEE Proc. Optoelectronics, 145(6), pp. 436–440, Dec. 1998.*

S–Yu Lin and J.Fleming, "A three dimensional optical photonic crystal", J. Light. Tech., 17(11), pp. 1944–1947, Nov. 1999.*

"Photonic Band Structure: The Face–Centered–Cubic Case Employing Nonspherical Atoms;" Yablonovitch et al.; Oct. 21, 1991; *The American Physical Society*; vol. 67, No. 17.

"Photonic band gap formation in certain self–organizing systems;" Busch et al.; Sep. 1998; *The American Physical Society*; vol. 58, No. 3.

"Existence of a Photonic Gap in Periodic Dielectric Structures;" Ho et al.; Dec. 17, 1990; *The American Physical Society*; vol. 65, No. 25.

(List continued on next page.)

*Primary Examiner*—John Juba
*Assistant Examiner*—Leo Boutsikaris
(74) *Attorney, Agent, or Firm*—Samuels, Gauthier & Stevens, LLP

(57) ABSTRACT

A periodic dielectric structure having a three-dimensional photonic bandgap and a method of fabricating same. The structure includes a plurality of stacked first and second two-dimensionally periodic slabs arranged in an alternating sequence. The first two-dimensionally periodic slabs comprising lower dielectric rods surrounded by higher dielectric material. The second two-dimensionally periodic slabs include higher dielectric rods surrounded by lower dielectric material. The rods of the first or second two-dimensionally periodic slabs are laterally offset from the rods of a nearest consecutive two-dimensionally periodic slab of the same type.

29 Claims, 10 Drawing Sheets

OTHER PUBLICATIONS

"Design of three–dimensional photonic crystals at submicron lengthscales;" Fan et al.; Sep. 12, 1994; *American Institute of Physics*.

"A 7 structure: A family of photonic crystals;" Chan et al.; Jul. 15, 1994; *The American Physical Society*; vol. 50, No. 3.

"Diamondlike photonic band–gap crystal with a sizable band gap;" K.M. Leung; Aug. 15, 1997; *The American Physical Society*; Third Series, vol. 56, No. 7.

"Photonic bands: simple–cubic lattice;" Sozuer et al.; Feb. 1993; *Optical Society of America*; vol. 10, No. 2.

"Fabrication of Photonic Crystals for the Visible Spectrum by Holographic Lithography," Campbell et al. *Nature*. Mar. 2000. vol. 404.

"Three–Dimensionally Periodic Dielectric Layered Strucutre with Omnidirectional Photonic Band Gap," Johnson et al. *Applied Physics Letter*. Nov. 2000. vol. 77, No. 22.

"Emulation of Two–Dimensional Photonic Crystal Defect Modes in a pHotonic Crystal with a Three–Dimensional Photonic Band Gap," Povinelli et al. *Physical Review B*. vol. 64.

* cited by examiner

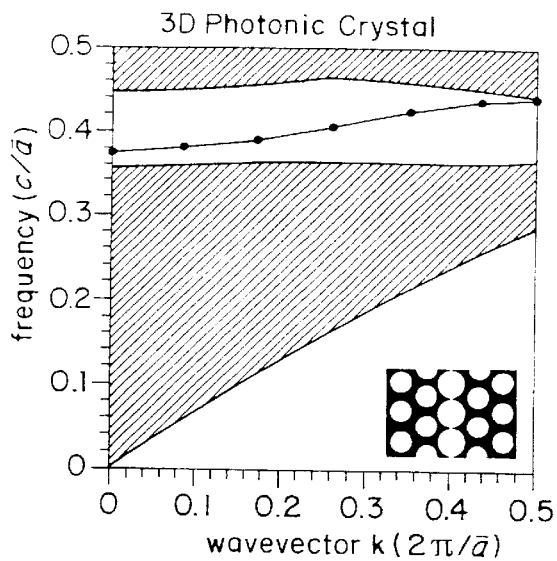 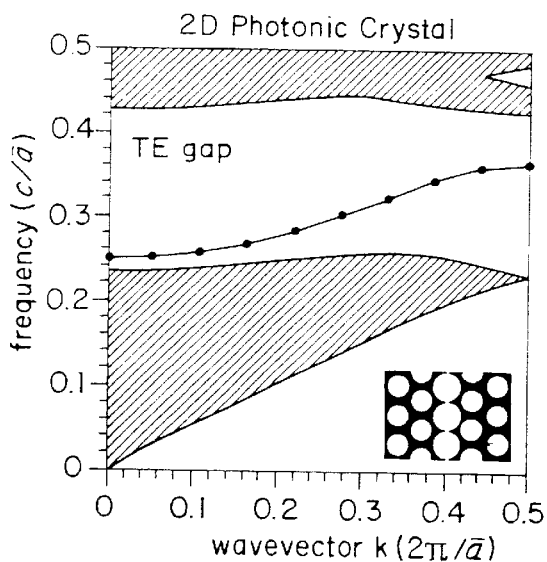
*FIG. 6A*  *FIG. 6B*
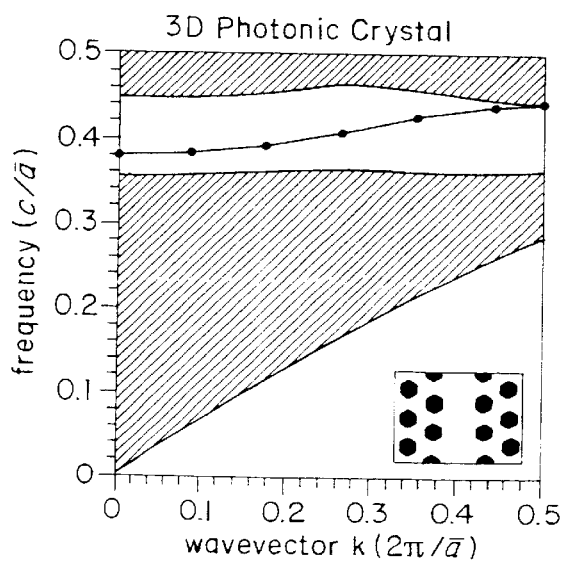 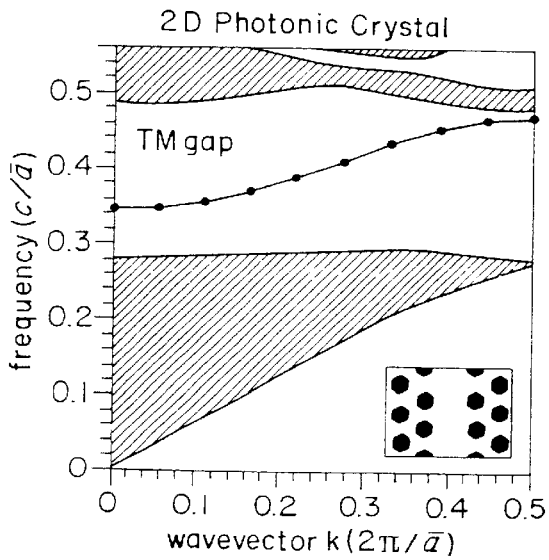
*FIG. 9A*  *FIG. 9B*

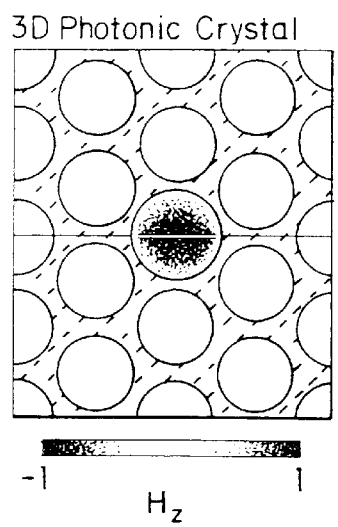
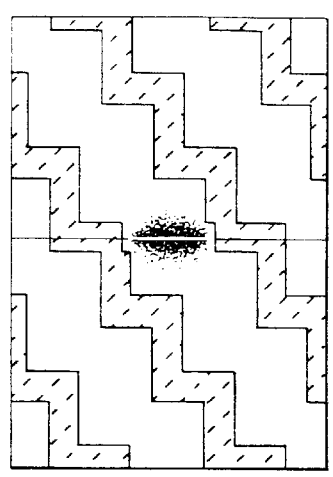
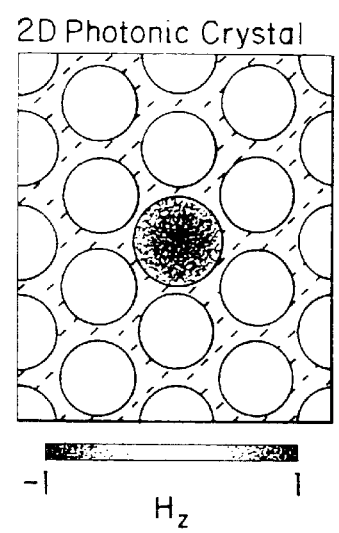
FIG. 11A  FIG. 11B  FIG. 11C
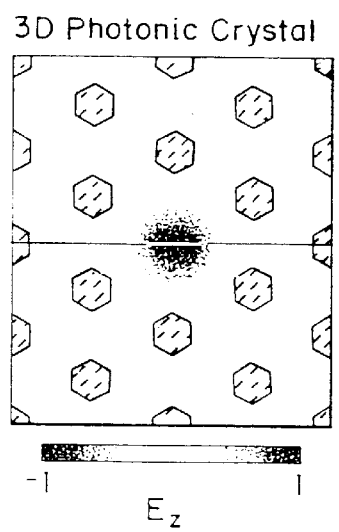
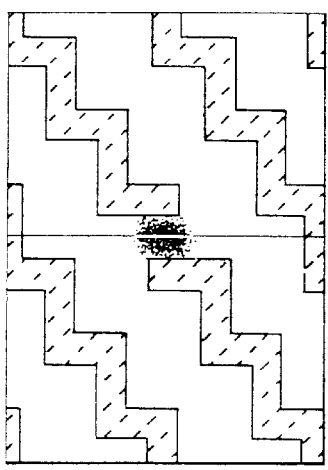
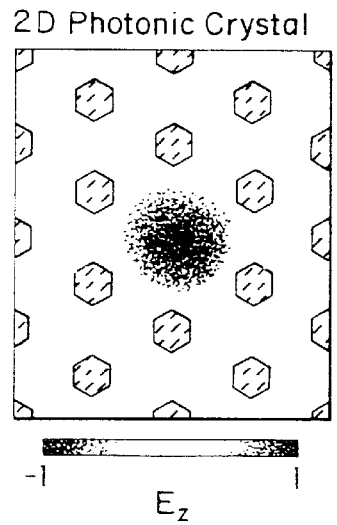
FIG. 12A  FIG. 12B  FIG. 12C

PERIODIC DIELECTRIC STRUCTURE HAVING A COMPLETE THREE-DIMENSIONAL PHOTONIC BAND GAP

This application claims priority from provisional application Ser. No. 60/224,049 filed Aug. 9, 2000.

PRIORITY INFORMATION

This invention was made with government support under Grant No. DMR-9808941 awarded by the National Science Foundation. The government has certain rights in the invention.

BACKGROUND OF THE INVENTION

The invention relates to the field of periodic dielectric structures, and in particular to such structures with complete or omnidirectional photonic band gaps.

Much research in recent years has been focused on photonic crystals: periodic dielectric (or metallic) structures with a photonic band gap (PBG), a range of frequencies in which light is forbidden to propagate. Photonic crystals provide an unprecedented degree of control over light, introducing the possibility of many novel optical devices and effects. One important area for potential applications is that of integrated optics; here, the band gap allows miniaturization to the ultimate wavelength scale while eliminating the inefficiencies and complexities caused by radiation losses in such devices.

Generally speaking, there have been two main categories of study regarding photonic-crystal systems for integrated optics: first, analyzing the phenomena and potential devices that a PBG makes possible; and second, figuring out how to realize these effects in practice. There is a need to bridge the gap between these two categories. It is therefore desirable to achieve a three-dimensional crystal, amenable to layer-by-layer lithographic fabrication, which permits the direct realization of theoretical results from two dimensions.

In order to understand PBG phenomena and to propose useful optical components that photonic crystals might make possible, researchers have often focused on two-dimensional systems. Working in two dimensions has many advantages, in addition to the substantial computational savings versus 3D. The electromagnetic fields are completely TE or TM polarized, with the electric or magnetic field, respectively, entirely in the plane. This reduces the vectorial Maxwell's equations to a scalar problem in terms of the field (magnetic or electric, respectively) perpendicular to the plane. As a result of this scalar, two-dimensional nature, visualization and understanding of theory and simulation are greatly simplified. Band gaps are achieved with uncomplicated structures, and symmetries are obvious. Another attraction of two dimensions that is particularly relevant in device design: when trapping light in linear defects (waveguides) and point defects (microcavities), the fixed polarization and simple geometries make it easy to predict, analyze, and manipulate the character of the localized modes introduced by the defects.

In two dimensions, photonic band gaps have been shown to make possible a number of useful optical components, some of which are shown in FIGS. 1A–1D: sharp bends, efficient waveguide splitters and intersections, and channel-dropping filters. FIGS. 1A–1D are top views of block diagrams of photonic-crystal devices in a two-dimensional crystal (square lattice of dielectric rods in air), showing the TM electric field value. All four devices have essentially 100% transmission, with no reflections or losses. FIG. 1A shows a 90° waveguide bend 100, FIG. 1B shows a channel-dropping filter 102, FIG. 1C shows an intersection 104 of two waveguides without crosstalk, and FIG. 1D shows a waveguide splitter/junction 106.

All of these devices are designed by combining a few well-understood elements (waveguides and cavities) and by employing general principles of resonance, symmetry, and coupled-mode theory. The attainable device characteristics are thereby known a priori, and minimal tuning is required to push the precise numerical results to the desired values. What makes all of this possible is the photonic band gap: it forces the light to exist only in one of a few states or channels, and transforms a problem with infinitely many directions of propagation into a one-dimensional system with a small number of variables. Although the same ideas can be then applied to conventional waveguides employing total internal reflection, the inevitable radiation losses of those systems spoil the perfection of the theory (and the devices). Such losses generally require ad hoc tuning to minimize, and greatly complicate the design, usage, and understanding of any component.

For example, consider the case of the waveguide bend in FIG. 1A. Because of the photonic band gap, light can do only one of two things when it hits the bend: go forward, or go back. The radiation that would plague any sharp bend in a conventional waveguide is completely absent, since light cannot propagate in the bulk crystal. Moreover, if the waveguide and bend region support only single-mode propagation, the problem can be described effectively as transmission through a one-dimensional potential well. If the bend/well is symmetric, a well-known result predicts resonant frequencies with 100% transmission, and nearly the exact transmission curve can be calculated via this model. Significantly, these predictions are independent of the exact crystal or waveguide structure, and depend only upon their symmetry and single-modality.

In order to realize two-dimensional photonic-crystal designs in three dimensions, one would ideally like to use the same 2D pattern for the 3D structure. That is, use a two-dimensionally-periodic slab, consisting of a two-dimensionally periodic dielectric structure with constant cross-section in the vertical direction and finite height, as depicted in FIGS. 2A and 2B for two typical structures. FIGS. 2A and 2B are perspective views of block diagrams of two-dimensionally-periodic slabs. By themselves, they can form photonic-crystal slabs, which use a combination of in-plane photonic band gaps and vertical index-guiding. FIG. 2A shows a triangular lattice 200 of dielectric rods 201 in air. FIG. 2B shows a triangular lattice 202 of air holes 203 in dielectric.

It will be appreciated that the exact shape of the rods/holes are of little importance; the key feature is their topology: a high/low dielectric region surrounded by low/high dielectric, respectively. In fact, such slabs form the building blocks of the new 3D crystal that is described herein.

With the slab alone, however, one encounters the obvious difficulty of how light is confined in the third dimension and the question of whether if one takes into account the third dimension, is there any longer a band gap. One possible answer to these questions, dubbed photonic-crystal slabs, uses index-guiding (total internal reflection) to confine light vertically. In this case, the higher index of the slab (compared to the material above and below) produces guided modes confined to the vicinity of the slab, and the periodicity creates a band gap where no guided modes exist. Although this is not a complete gap due to the presence of radiating modes at all frequencies (the light cone), it can be used to losslessly confine light in linear waveguides and to imperfectly trap light in resonant cavities.

The lack of a complete band gap leads to a number of difficulties, however. First, whenever translational symmetry is broken, e.g., by a bend or a cavity, radiation losses are inevitable. Although such losses can often be minimized, they must be continually taken into account, just as for conventional waveguides. A second limitation is that the need for waveguide modes to be index-guided, and thus to lie underneath the light line, produces a limited bandwidth and low group velocities in a periodic slab (compared to two-dimensional crystals or to conventional waveguides). Nevertheless, because of their relative ease of fabrication, slab structures continue to attract considerable experimental and theoretical attention. Another interesting system with somewhat different tradeoffs uses in-plane resonant modes above the light line, i.e., not guided, which more closely model the two-dimensional modes at the expense of large aspect ratios required everywhere to minimize radiation losses.

A full realization of a photonic band gap requires a crystal periodic in all three dimensions, and many such structures have been proposed. Some of the most attractive systems for integrated optics are planar-layer structures. These systems have piecewise-constant cross-sections, and can thus be fabricated in a layer-by-layer fashion using traditional micro-lithography. The fine control provided by lithography promises the ability to precisely place defects in the crystal in order to construct integrated optical devices. The planar-layer crystal that has been most commonly fabricated (with success even at micron lengthscales), is the layer-by-layer (or woodpile) structure, dielectric logs stacked in alternating perpendicular directions with a 4-layer period, forming an fcc crystal oriented in the 100 direction. However, this and other previous planar-layer structures lack rotational symmetry in any given plane, meaning that integrated optical networks will require defects to extend across multiple layers of the structures. Moreover, the nature of the defect modes so confined will have significant qualitative differences from those in two-dimensional crystals, because the dielectric structure where the mode resides does not resemble a 2D crystal. The one exception to this rule is the simple-cubic scaffold lattice, which has square-lattice symmetry in its cross sections, albeit with a small 6–7% gap.

SUMMARY OF THE INVENTION

Accordingly, the invention provides a photonic-crystal structure with a complete (omnidirectional) three-dimensional photonic band gap (PBG) and its potential application to integrated optics. The structure not only has a large band gap and is amenable to layer-by-layer litho-fabrication, but also introduces the feature of high-symmetry planar layers resembling two-dimensional photonic crystals. This feature enables integrated optical devices to be constructed by modification of only a single layer, and supports waveguide and resonant-cavity modes that strongly resemble the corresponding modes in the simpler and well-understood 2D systems.

In contrast to previous attempts to realize 2D crystals in 3D via finite-height slabs, however, the complete PBG of the invention eliminates the possibility of radiation losses. Thus, it provides a robust infrastructure within which to embed complex optical networks, combining elements such as compact filters, channel-drops, and waveguide bends/junctions that have previously been proposed in 2D photonic crystals.

In one exemplary embodiment of the invention there is provided a periodic dielectric structure having a three-dimensional photonic bandgap. The structure includes a plurality of stacked first and second two-dimensionally periodic slabs arranged in an alternating sequence. The first two-dimensionally periodic slabs comprising lower dielectric rods surrounded by higher dielectric material. The second two-dimensionally periodic slabs include higher dielectric rods surrounded by lower dielectric material. The rods of the first or second two-dimensionally periodic slabs are laterally offset from the rods of a nearest consecutive two-dimensionally periodic slab of the same type.

BRIEF DESCRIPTION OF THE DRAWINGS

FIG. 6A is a projected band structure for a 3D crystal with a linear defect created by altering a single hole layer; FIG. 6B is a projected band structure for the TE modes of a 2D crystal with identical geometry to the cross-section of the 3D crystal shown in FIG. 6A;

FIG. 9A is a projected band structure for a 3D crystal with a linear defect created by removing a row of nearest-neighbor rods in a single rod layer, resulting in the cross section shown in the inset; FIG. 9B is a projected band structure for the TM modes of a corresponding 2D crystal;

FIGS. 10A–10C are mode profiles for the removed-rod linear-defect state of FIGS. 9A–9B at k=0.53π/a;

FIGS. 11A and 11B are mode profiles for a point defect in a 3D crystal, created by increasing the radius of a single hole to $r_h'=0.5\overline{a}$ in one hole layer; FIG. 11C is a mode profile for the TE defect state in a corresponding 2D crystal; and FIGS. 12A and 12B are mode profiles for a point defect in a 3D crystal, created by removing a single rod from one rod layer; FIG. 12C is a mode profile for the TM defect state in a corresponding 2D crystal.

DETAILED DESCRIPTION OF THE INVENTION

Figure 2A:
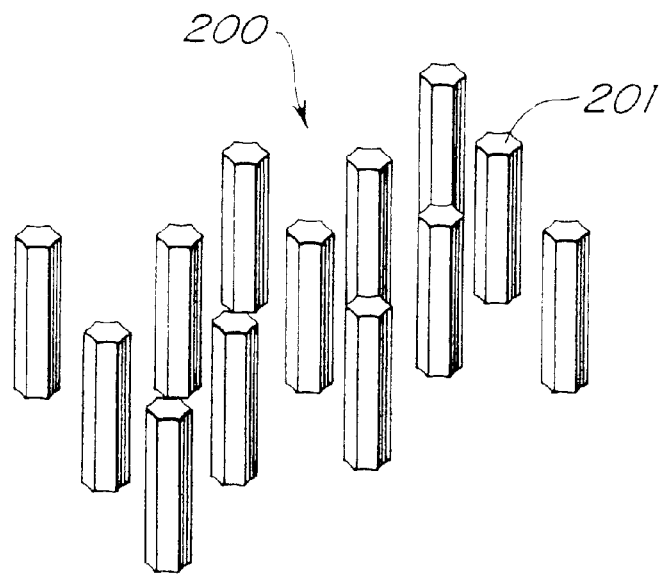
FIGS. 2A and 2B are perspective view of block diagrams of two-dimensionally-periodic slabs of rods and holes, respectively.
Figure 2B:
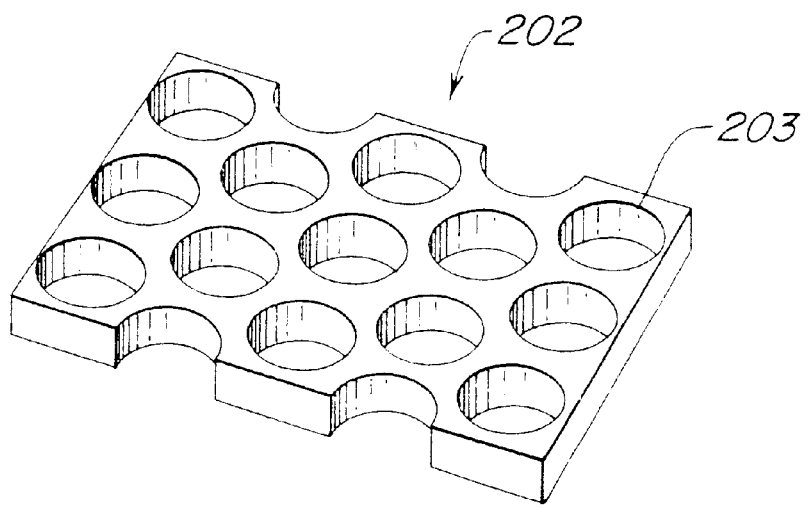
Figure 3:
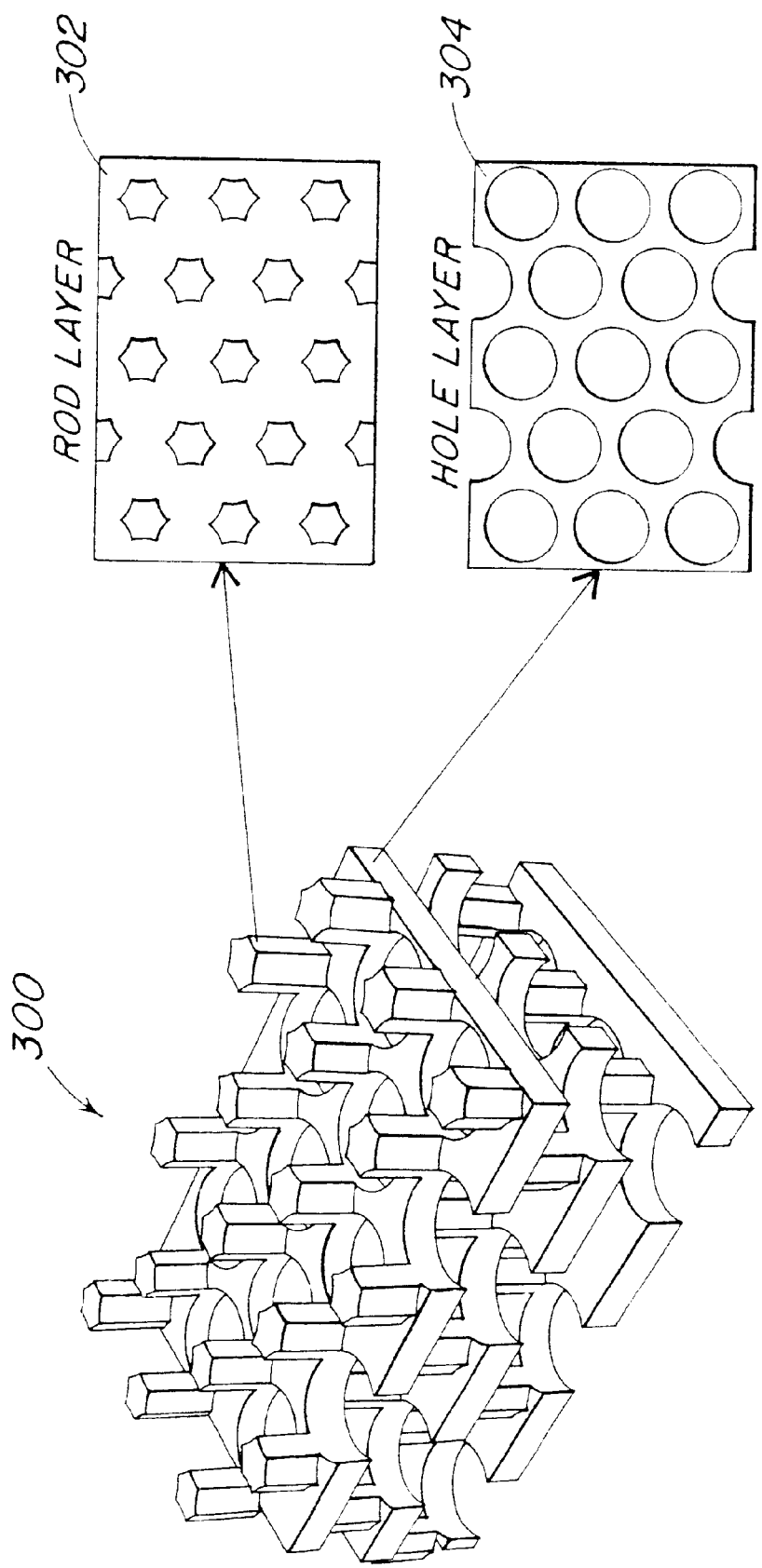
FIG. 3 is a perspective view of a block diagram of an exemplary embodiment of a three-dimensionally periodic photonic crystal 300 with an omnidirectional band gap.

FIG. 3 is a perspective view of a block diagram of an exemplary embodiment of a three-dimensionally periodic photonic crystal 300 with an omnidirectional band gap. The structure has several horizontal periods and one vertical period, consisting of an fcc lattice of air holes (radius 0.293 a, height 0.93 a) in dielectric (21% fill). The structure has a gap of 21% of the midgap frequency for a dielectric constant of 12. The lattice produces an alternating sequence of two layers, whose cross sections are: rod layers 302 and hole layers 304. The layers have high symmetry and the cross-sections form well-known two-dimensional photonic crystals. That is, the layers are an alternating sequence of the 2D-periodic slabs of FIGS. 2A and 2B.

The crystal's fcc lattice (possibly distorted) is of air (or low-index) cylinders in dielectric, oriented along the 111 direction. Such a lattice results in a graphite-like system of planar layers of the two types from FIGS. 2A and 2B: triangular lattices of air holes in dielectric and dielectric cylinders (rods) in air. The sculptured appearance of the rods is not important and is simply a by-product of a fabrication method. These layers are stacked in a repeating, 3-layer sequence (along 111) and should be amenable to planar lithographic techniques.

Figure 4A:
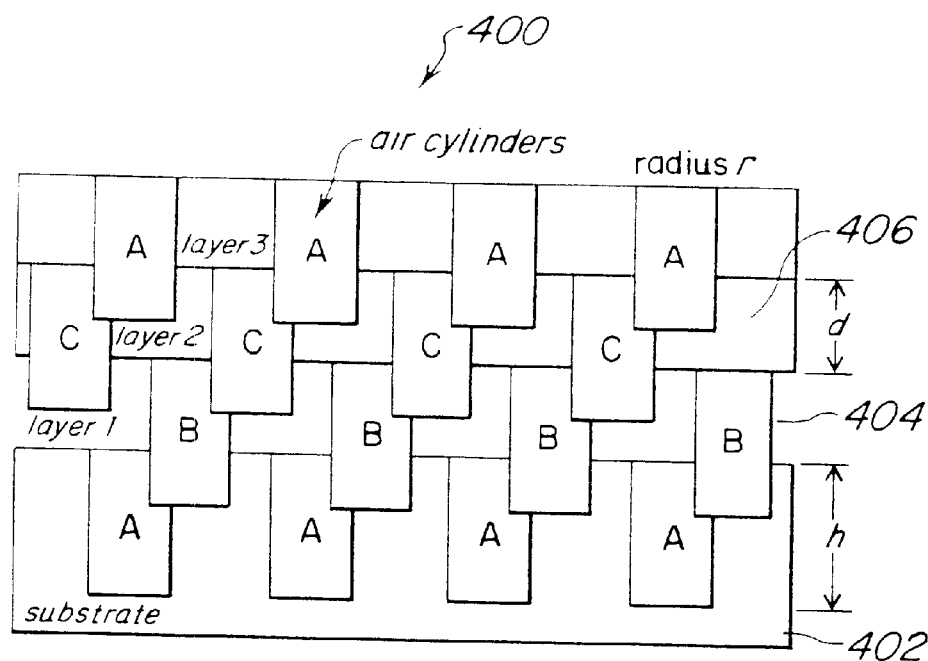
FIGS. 4A and 4B are side and top view schematic diagrams, respectively, of an exemplary layering technique for a crystal 400, similar to that of crystal 300 shown in FIG. 3.
Figure 4B:
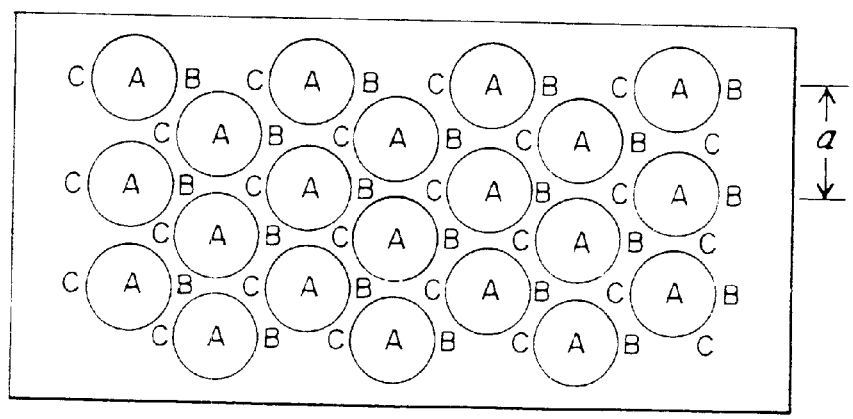

A photonic-crystal 400 in accordance with the invention is amenable to layer-by-layer fabrication, which might proceed along the following schematic lines, as depicted in FIGS. 4A and 4B. First, a layer of cylindrical holes (labeled "A") are etched into a high-index substrate 402, e.g., Si). Next, the holes A are back-filled with another material, e.g., $SiO_2$. The surface is planarized to the top of the high-index substrate, and a second layer 404 of high-index material is grown on top. Then, the next layer of holes B is etched to the appropriate depth, but offset from the holes A as shown in the FIG. 4B. The holes B are then filled and covered with a layer 406 of material. This back-filling, planarizing, growth, and etching is repeated for the holes C and then for the next layer of holes A (in "layer 3"), at which point the structure repeats itself. When the desired layers are grown, the back-fill material is removed, e.g., by a solvent, and a high-contrast photonic-crystal is obtained.

Other variations are possible. One could leave the backfill material in the structure if it is low-index, and a complete PBG (albeit smaller, 8.4% for $Si/SiO_2$) can still be obtained; equivalently, a lower-index substrate could be used with air holes. Also, the layers could be fabricated individually, and then inverted and bonded together; this method has been demonstrated on the woodpile structure. Alternatively, one may fabricate the rod and hole layers using separate steps, requiring twice as many interlayer alignments but removing the need to etch two materials simultaneously. A very similar structure was thus fabricated for 8 $\mu$m wavelength, although the existence of a gap was not determined. Calculations show that the resulting extra degree of freedom, the rod radius, allows a maximum gap of over 26% for Si/air.

Figure 5A:
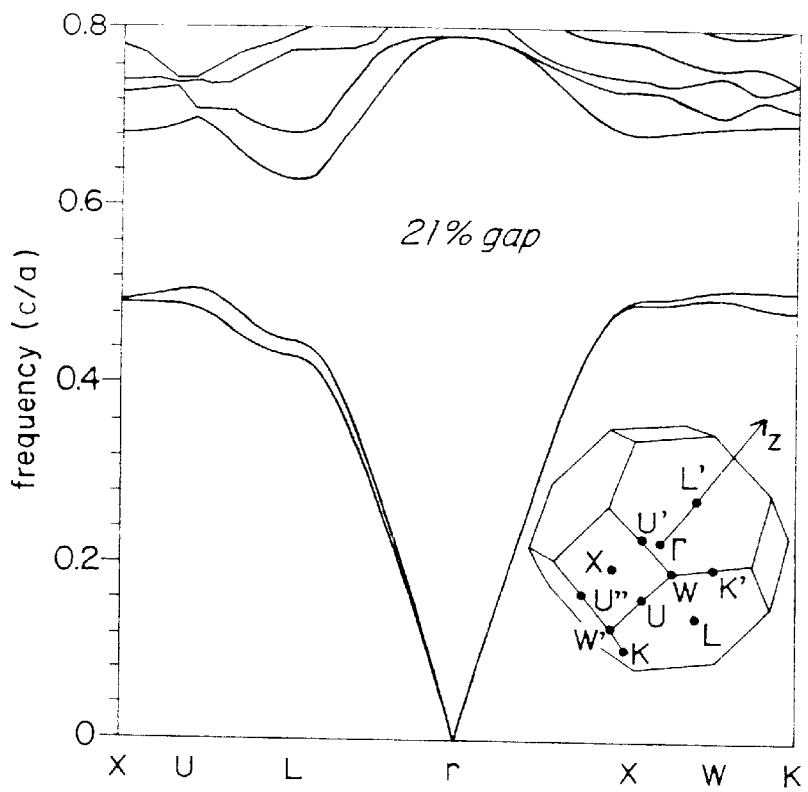
FIGS. 5A and 5B are a band diagram and vertical transmission spectrum graph for the structure of FIG. 3.

The band diagram for the crystals 300 and 400 is shown in FIG. 5A. The band diagram shows frequency in scale-invariant units vs. wavevector along important symmetry directions in the irreducible Brillouin zone. The inset shows the first Brillouin zone and its symmetry points. The band diagram has a complete gap of over 21% for Si:air dielectric contrast ($\in$=12:1 at 1.55 $\mu$m), and of over 8% even for Si:SiO2 contrast ($\in$=12:2). The PBG persists down to $\in$ contrasts of 4:1 (2:1 index contrast). Even larger gaps, of over 26%, can be achieved for Si:air by controlling the rod and hole radii independently, at the expense of extra alignment steps in the fabrication process.

Figure 5B:
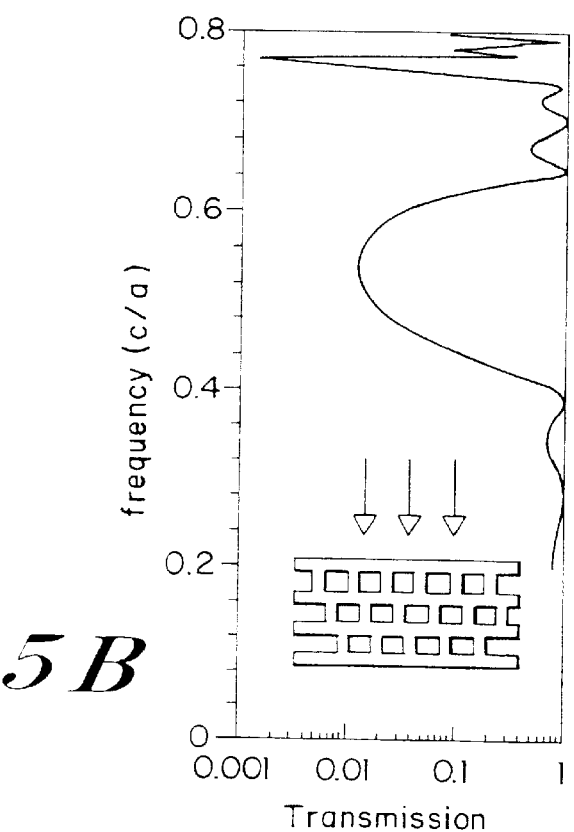

The vertical transmission through roughly one period (three bilayers plus a hole layer) of the structure, shown in FIG. 5B, is attenuated by about 20 dB in the gap. FIG. 5B is a graph of the vertical transmission spectrum for slightly over one period (three layers plus a capping hole layer, as shown in the inset) of the structure, showing the Γ-L' gap.

Other generalizations of this crystal structure are easily imagined. For example the alternating 2D-periodic slabs that form the 3D crystal could be square lattices instead of triangular, and/or could have different stacking sequences. For example, instead of abcabc as shown in FIG. 3, it could be abab or abcdabcd, where each letter here indicates a pair of slabs with some lateral offset.

Because of the high-symmetry, 2D-crystal cross sections, most integrated devices will require modification of only a single layer of the crystal. Moreover, when one forms waveguides, cavities, and other components by introducing defects into the crystal, the resulting optical modes (and thus behaviors) closely resemble those in the corresponding two-dimensional photonic crystal. This should allow designs and results from the simpler 2D systems to be applied almost directly in three dimensions and, at the same time, the complete band gap totally prohibits radiation losses. Moreover, because the defect modes of the 3D crystal can be visualized and understood largely in terms of their mostly-polarized in-plane cross sections, much of the theoretical simplicity of the original two-dimensional structures is retained. Unlike the 2D systems, where the band gap is typically only for the TM or TE polarization of in-plane light, the band gap in our crystal extends for all possible polarizations and propagation directions of light.

Most of the computations herein are eigenmode analyses of the photonic crystal of the invention and of defect modes therein, yielding the band structures, dispersion relations, and eigen-fields of the perfect crystal, waveguides, and resonant cavities. These fully-vectorial eigenmodes of Maxwell's equations were computed with periodic boundary conditions by preconditioned conjugate-gradient minimization of the block Rayleigh quotient in a planewave basis.

For waveguides and resonant cavities, the periodic boundary conditions involve a supercell approximation, where the supercell boundaries are placed sufficiently far from the defect so as to not affect the frequency or field of localized modes. Because of the large band gap, the modes are strongly localized and the supercell size need not be more than a few lattice constants.

The transmission spectrum of FIG. 5B is the result of a 3D finite-difference time-domain (FDTD) simulation with a normal-incidence (Γ-L') planewave source, absorbing boundaries above and below, and periodic boundaries at the sides.

The band diagram depicted in FIG. 5A is for air holes of radius r=0.293 a and height h=0.93 a (a is the fcc lattice constant) and a dielectric constant $\in$=12, and has a 20.9% complete PBG. There are other symmetry points in the irreducible Brillouin zone of this structure that were calculated but are not shown in the band diagram, because their band edges do not determine the gap in this case. These are the parameters that are used for the bulk crystal in the subsequent defect computations.

More generally, one can apply a trigonal distortion to the fcc lattice of the invention to obtain a trigonal lattice without breaking any additional symmetry. The lattice vectors in this case become the three permutations of (1,1,z)a/2(z=0 for fcc), with layer-thickness d=|1+z/2|a/$\sqrt{3}$ and in-plane lattice constant $\bar{a}$=|1−z|a/$\sqrt{2}$ as defined in FIGS. 4A and 4B. The parameter z can be varied to further optimize the gap. The parameters of FIG. 3 were optimal for the fcc case of z=0. The gap was also maximized for varying z and dielectric contrast, with results in Table I below. In general, the structure strongly prefers the fcc case with its nearly-spherical Brillouin zone, and distortions seem to increase the gap percentage by no more than 0.5.

Table I. Optimal parameters and gaps for various dielectric contrasts.

TABLE I

Optimal parameters and gaps for various dielectric contrasts.

| ϵ contrast | r | H | z | mid-gap v | gap size |
|---|---|---|---|---|---|
| 12:1 (Si:air) | 0.285a | 0.960a | 0.0165 | 0.579 c/a | 21.4% |
| 6:1 | 0.273a | 0.908a | −0.00246 | 0.648 c/a | 8.4% |
| 12:2 (Si:SiO$_2$) | | | | 0.458 c/a | |
| 4.5:1 | 0.265a | 0.900a | −0.00612 | 0.688 c/a | 2.7% |
| 4:1 (SiO$_2$:air) | 0.259a | 0.895a | −0.00778 | 0.699 c/a | 0.33% |

The confinement of light in waveguides and resonant cavities created by making defects in a single layer of the bulk crystal, either a rod layer or a hole layer, will now be described. It will be shown that the corresponding localized modes correspond closely to those supported in the analogous two-dimensional crystal and defect. For these calculations, the parameters r=0.293 a, h=0.93 a, z=0 (fcc), and ϵ=12 are used. In order to facilitate comparison to the two-dimensional structures, units of $\bar{a}$ (the in-plane lattice constant) for distance, $2\pi/\bar{a}$ for wavevectors, and $c/\bar{a}$ for frequency are used. In these units, the hole radius is $r_h$=0.414 $\bar{a}$, and the thickness of a hole layer is 0.318 $\bar{a}$. The radius of a cylindrical rod with the same area as a rod in the structure is $r_r$=0.175 $\bar{a}$, and the thickness of a rod layer is 0.500 $\bar{a}$.

By creating a linear defect in a photonic crystal, a waveguide may be formed. By adding or removing dielectric, one or more states are pulled down or pushed up into the gap, respectively, and are thereby localized to the vicinity of the defect. Since discrete translational symmetry remains in the direction parallel to the waveguide, the wavevector in this direction is conserved. The states propagate without scattering, and their frequencies can be plotted versus wavevector to form a continuous dispersion relation. Because the photonic-crystal of the invention has a complete band gap, the modes decay exponentially away from the waveguide in all directions, including vertically, so the mode is strongly confined to the planar layer of the defect. For this reason, one can hope that the modes will strongly resemble those in the corresponding two-dimensional structure, and this hope is justified numerically below.

Waveguides formed by modifying a single hole layer of the 3D photonic crystal, increasing the radii of a line of nearest-neighbor holes from $r_h$=0.414 $\bar{a}$ to $r_h'$=0.5 $\bar{a}$(tangent) are first considered. This introduces a TE-like mode into the hole layer, just as the corresponding two-dimensional structure (with a TE band gap) supports a TE guided mode.

FIG. 6A is a projected band structure for a 3D crystal with a linear defect created by altering a single hole layer. Shown in the inset is a horizontal cross section through the mid-plane of the defect. The defect holes have radius $r_h'$=0.5$\bar{a}$, vs. $r_h$=0.414$\bar{a}$ in the bulk, where $\bar{a}$ is the in-plane lattice constant. FIG. 6B is a projected band structure for the TE modes of a 2D crystal with identical geometry to the cross-section of the 3D crystal shown in FIG. 6A.

The dispersion relation for the 3D line-defect structure shown in FIG. 6A is compared with that for the 2D structure (with the same cross-section) in FIG. 6B. Shaded regions indicate extended states in the perfect crystal, and for the 2D structure only TE modes are shown. In both cases, it is observed that the waveguide is single-mode: a single defect band extends almost all the way across the gap, but does not intersect the band edges.

Figure 7C:
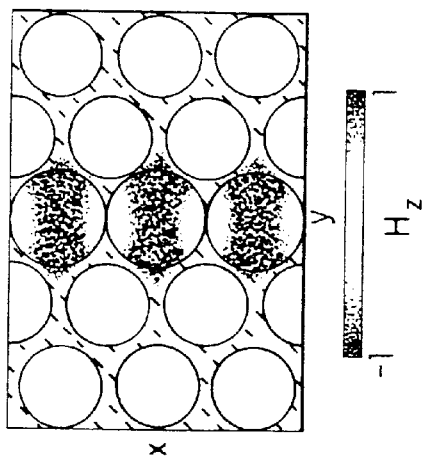
FIGS. 7A–7C are mode profiles for the increased-hole linear-defect states from FIGS. 6A–6B at the Brillouin zone edge.
Figure 7B:
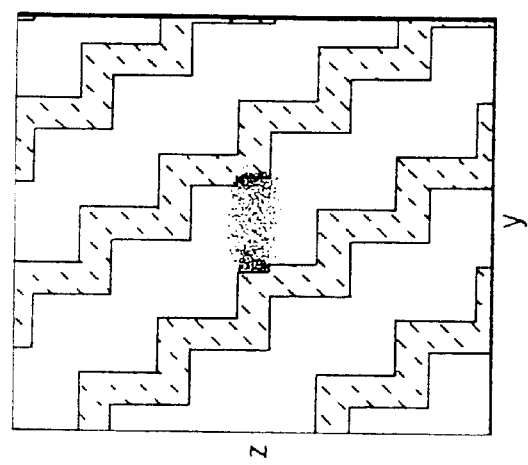
Figure 7A:
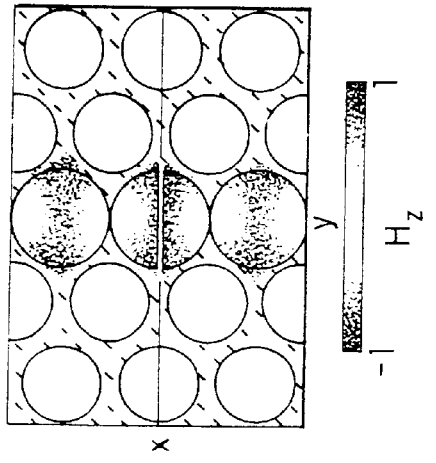

In addition to the resemblance in band structures, there is a strong, quantifiable similarity between the defect modes in the 3D and 2D crystals. FIGS. 7A and 7B show the magnetic-field z-component for the 3D defect state at the $k=\pi/\bar{a}$ edge of the Brillouin zone, with horizontal and vertical cross-sections bisecting the hole layer, along with its 2D counterpart in FIG. 7C. FIGS. 7A–7C are mode profiles for the increased-hole linear-defect states from FIGS. 6A–6B at the Brillouin zone edge. The overlaid cross hatches indicate regions of high dielectric material. FIGS. 7A and 7B show the field for the 3D linear-defect structure corresponding to FIG. 6A. $H_z$ is plotted for horizontal and vertical cross sections of the 3D crystal. The cross sections intersect along the lines on the figures. FIG. 7C shows $H_z$ for the 2D linear-defect structure from FIG. 6B.

The fields exhibit a clear visual similarity, indicating the analogous character of the defect modes in 2D and 3D, and this similarity can be quantified in two ways. First, just as the 2D state is purely TE, the 3D field is 98% TE polarized in the horizontal mid-plane of the layer. Second, the overlap integral between the 2D and 3D field profiles in the mid-plane is found to be 94%.

Figure 8:
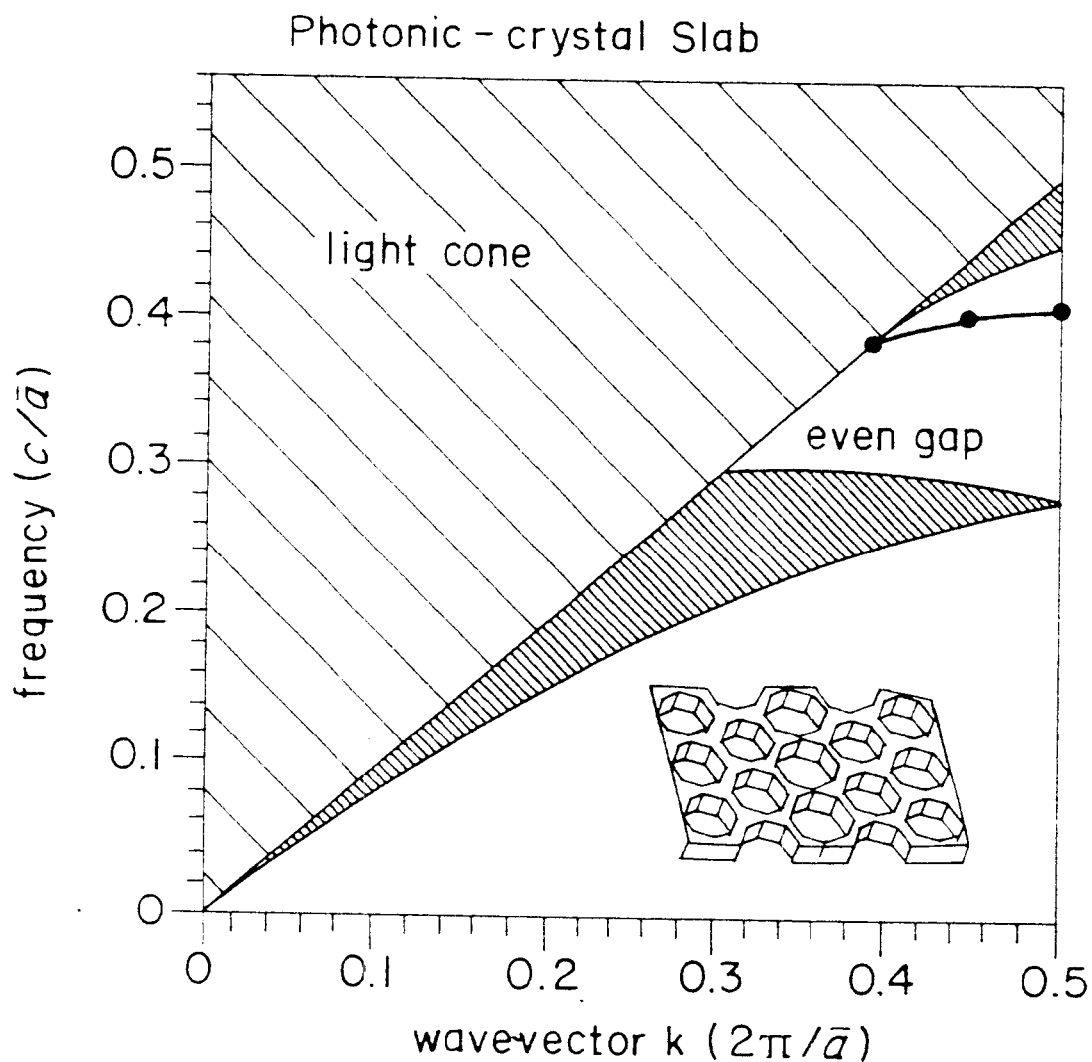
FIG. 8 is a projected band structure for a photonic-crystal slab, with a linear defect as in FIGS. 6A–6B.

For comparison, the analogous waveguide in a photonic-crystal slab is considered. Here, the photonic-crystal slab has the same cross-section as that of a hole layer, but is surrounded by air and has a thickness of 0.71 $\bar{a}$ (chosen to approximately maximize its gap). FIG. 8 is a projected band structure for a photonic-crystal slab, with a linear defect as in FIGS. 6A–6B. In FIG. 8, the dispersion relation for an equivalent hole-defect waveguide in the photonic-crystal slab is exhibited, and the differences with those of FIGS. 6A–6B are striking. The slab band diagram is shadowed by a light cone (the light-grey region); only those modes lying beneath the light cone are vertically confined by index-guiding. Thus, the slab waveguide mode only exists near the edge of the Brillouin zone where its group velocity goes to zero, and consequently it has a narrow bandwidth.

It is now shown that a TE-like defect mode can be introduced into the 3D photonic crystal by altering a hole layer. A TM-like defect mode can similarly be created by modifying a rod layer of the structure. In this case, a row of nearest-neighbor rods is completely removed to form the defect, relying upon the dramatic ability of a photonic crystal to guide light even in air. Again, a comparison is made to the analogous defect in a 2D crystal, this time a rod lattice (with a gap in its TM modes). The resulting dispersion relations in FIGS. 9A–9B, as before, display in both cases a single-mode band that covers almost the entire gap and extends over the entire Brillouin zone.

FIG. 9A is a projected band structure for a 3D crystal with a linear defect created by removing a row of nearest-neighbor rods in a single rod layer, resulting in the cross section shown in the inset. FIG. 9B is a projected band structure for the TM modes of the corresponding 2D crystal.

Figure 10C:
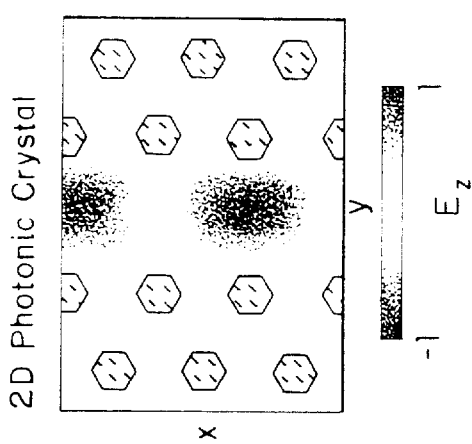
Figure 10B:
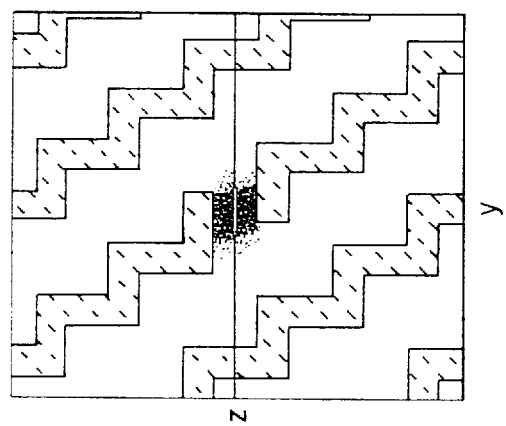
Figure 10A:
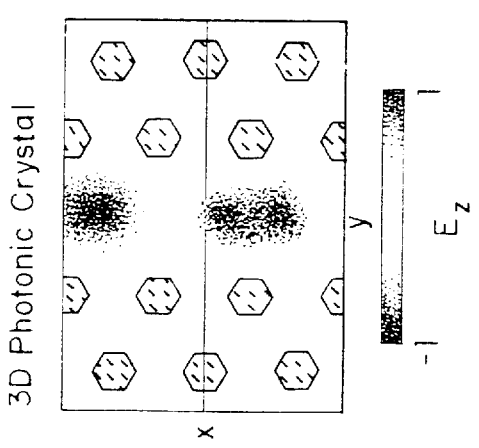

FIGS. 10A–10C are mode profiles (for the z-component of the electric field due to the TM polarization) for the removed-rod linear-defect state of FIGS. 9A–9B at k=0.53π/$\bar{a}$; FIGS. 10A and 10B show the fields for a 3D linear-defect structure of FIG. 9A, with $E_z$ plotted for horizontal and vertical cross-sections. FIG. 10C shows the field for the 2D structure of FIG. 9B. Almost indistinguishable to the eye, they testify to the close physical connection between the behaviors of the two systems. Just as for the hole-layer waveguide, this similarity is quantified in two ways. First, just as the 2D mode is purely TM, the 3D mode is 99% TM-polarized in the mid-plane. Second, the overlap integral between the 2D and 3D field profiles in the mid-plane is 98%.

If one considers a photonic-crystal slab with the cross-section of the rod layer and a thickness of 2 $\bar{a}$ to approximately maximize its gap, it is found that there is no guided mode at all (or, at best, one very weakly guided at the upper edge of the gap). This is, indeed, the expected result. By removing a row of rods from a slab, there is no longer enough index contrast to guide the mode in the vertical direction. In other words, the guided bands of FIG. 9 lie inside the light cone of an index-guided slab.

Next to waveguides, the other major building block for optical devices is the resonant cavity, which traps one or more discrete electromagnetic modes in a point-like region (confined in all three dimensions). They are resonant modes because they do leak out eventually. This is by design, since the light has to escape in order to be useful. The light must only escape, however, into specific desired channels, typically into a waveguide, and therein lies the problem with resonant cavities in conventional systems (ring resonators) and photonic-crystal slabs. In the absence of a complete photonic band gap, losses from the cavity into the radiation continuum are inevitable, and minimization of these losses requires tradeoffs such as delocalization or careful tuning.

Figure 1A:
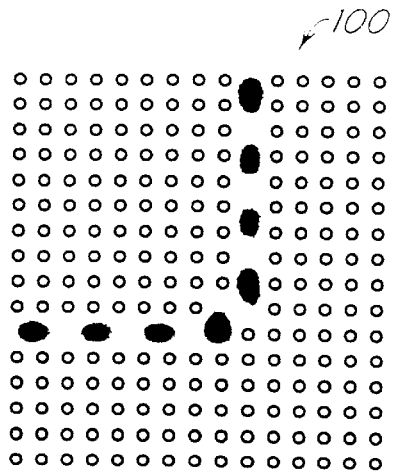
FIGS. 1A–1D are top views of block diagrams of photonic-crystal devices in a two-dimensional crystal (square lattice of dielectric rods in air)
Figure 1C:
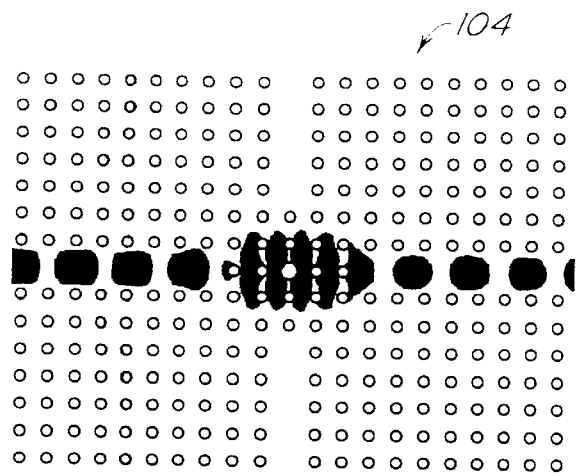
Figure 1B:
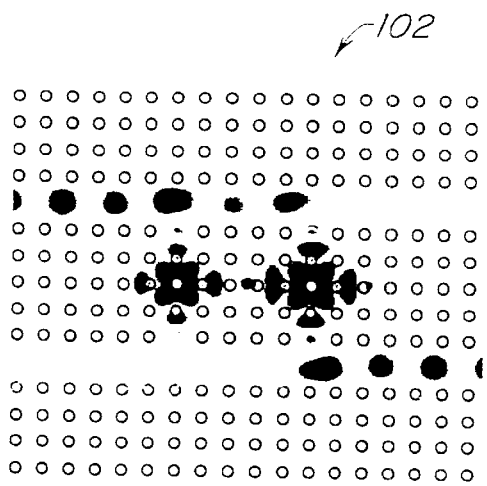
Figure 1D:
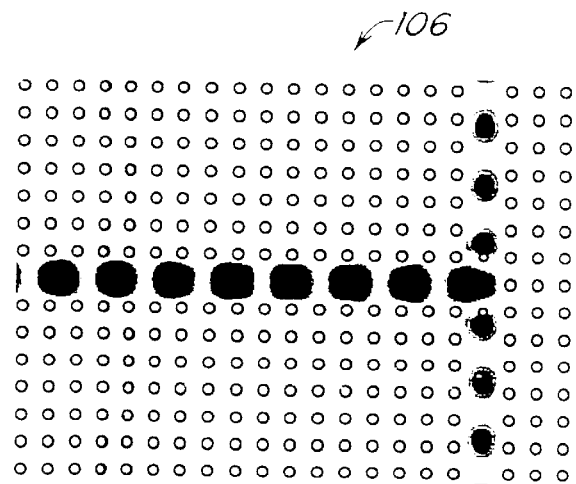

In contrast, with a 3D photonic crystal, radiation leakage can be made arbitrarily small merely by adding more layers of bulk crystal around the cavity. Like the two-dimensional devices of FIGS. 1A and 1B, the cavity can only decay into deliberately introduced channels. Microcavities are created by introducing a localized defect into the 3D crystal, and can be designed to have any desired symmetry and frequency. In this section, such point defects are created by modifying only a single hole or rod layer of the crystal, and a demonstration of how one can mimic the behavior of the analogous 2D crystal defect is provided.

First, a cavity in a hole layer is created by increasing the radius of a single hole to $r_h'=0.5\ \bar{a}$. This creates a single TE-like defect mode in the gap (0.36–0.44 c/$\bar{a}$) at a frequency of 0.40. FIGS. 11A and 11B are mode profiles for a point defect in a 3D crystal, created by increasing the radius of a single hole to $r_h'=0.5\ \bar{a}$ in one hole layer. $H_z$ is plotted for horizontal and vertical cross sections. FIG. 11C is a mode profile for the TE defect state in a corresponding 2D crystal. The 2D defect mode has a frequency of 0.28 c/$\bar{a}$, in the TE gap from 0.26–0.43 c/$\bar{a}$. As was seen with the waveguide modes, the field patterns are almost identical in 3D, with the 3D field being 98% TE and an overlap of 92% between 3D and 2D.

Likewise, a cavity is created in a rod layer by removing a single rod, producing a single TM-like defect mode in the gap at a frequency of 0.41 c/$\bar{a}$. The corresponding 2D structure, with a TM gap from 0.30–0.48 c/$\bar{a}$, has a defect mode at 0.41 c/$\bar{a}$. FIGS. 12A and 12B are mode profiles for a point defect in a 3D crystal, created by removing a single rod from one rod layer. $E_z$ is plotted for horizontal and vertical cross sections. FIG. 12C is a mode profile for the TM defect state in a corresponding 2D crystal. Again, the similarity in field patterns can be quantified by the 3D field being 99% TM and an overlap of 97% between 3D and 2D.

In summary, a photonic-crystal structure with a complete three-dimensional band gap has been demonstrated. This structure has a very large gap, is tolerant of low index contrast, is amenable to layer-by-layer fabrication, and can be thought of as a stack of 2D photonic-crystal layers. This last feature, in the context of a large three-dimensional gap, permits simplified construction of complicated optical networks by modifying only a single layer, without breaking symmetry between different directions in the plane. It has been shown how the defect modes thus created are almost identical to those in the corresponding two-dimensional system. This allows one to build on the many theoretical and computational attractions of 2D, as well as the large body of existing work and analyses for those basic systems, without the inherent problems of losses due to the lack of a complete PBG. Moreover, because of the similarity in the defect states and the complete band gap, one expects that the behavior of more complicated, integrated devices in this crystal will also quantitatively resemble their two-dimensional counterparts.

Although the present invention has been shown and described with respect to several preferred embodiments thereof, various changes, omissions and additions to the form and detail thereof, may be made therein, without departing from the spirit and scope of the invention.

What is claimed is:

1. A periodic dielectric structure having a three-dimensional photonic bandgap comprising a plurality of stacked first and second two-dimensionally periodic slabs arranged in an alternating sequence, said first two-dimensionally periodic slabs comprising lower dielectric rods surrounded by higher dielectric material, said second two-dimensionally periodic slabs comprising higher dielectric rods surrounded by lower dielectric material, said rods of said first or second two-dimensionally periodic slabs being laterally offset from the rods of a nearest consecutive two-dimensionally periodic slab of the same type.

2. The structure of claim 1, wherein said first and second two-dimensionally periodic slabs have triangular lattice symmetry.

3. The structure of claim 1, wherein said first and second two-dimensionally periodic slabs have square lattice symmetry.

4. The structure of claim 1, wherein said offsets are configured such that the rods of said first or second two-dimensionally periodic slabs are laterally aligned with rods of a third consecutive slab of the same type.

5. The structure of claim 1, wherein said offsets are configured such that the rods of said first or second two-dimensionally periodic slabs are laterally aligned with rods of a fourth consecutive slab of the same type.

6. The structure of claim 1, wherein said offsets are configured such that the rods of said first or second two-dimensionally periodic slabs are laterally aligned with rods of a second consecutive slab of the same type.

7. The structure of claim 1, wherein said lower dielectric material or lower dielectric rods comprise air.

8. The structure of claim 1, wherein said higher or lower dielectric rods have a generally hexagonal cross section.

9. The structure of claim 1, wherein said higher or lower dielectric rods have a generally square cross section.

10. The structure of claim 1, wherein said higher or lower dielectric rods have a generally circular cross section.

11. The structure of claim 1, wherein said bandgap includes wavelengths less than 5 $\mu$m.

12. The structure of claim 1, wherein said bandgap includes wavelengths greater than 10 $\mu$m.

13. The structure of claim 1, wherein said first or second two-dimensionally periodic slabs includes a defect.

14. A method of fabricating a dielectric structure having a three-dimensional photonic bandgap comprising:
  (a) providing a first layer of a first material;
  (b) forming a first two-dimensionally periodic array of holes in said first layer;
  (c) filling said holes with a second material;
  (d) providing a subsequent layer of said first material on said previous layer of first material and said filled holes
  (e) forming a second two-dimensionally periodic array of holes that penetrates through and below said subsequent layer so as to also penetrate into said first layer; and (f) repeating steps (c)–(e) a number of times to form a multi-layered structure.

15. The method of claim 14, wherein said first material comprises a higher dielectric material than said second material.

16. The method of claim 14, wherein said second material comprises a higher dielectric material than said first material.

17. The method of claim 14, wherein said first or second material is subsequently removed.

18. The method of claim 14 further comprising bonding said multi-layered structure to another multi-layered structure.

19. The method of claim 14, wherein said first and second two-dimensionally periodic arrays have triangular lattice symmetry.

20. The method of claim 14, wherein said first and second two-dimensionally periodic arrays have square lattice symmetry.

21. The method of claim 14, wherein the holes of step (e) are laterally offset from the holes of step (b) or the holes of subsequent steps (e).

22. The method of claim 21, wherein the offsets are configured such that the holes of step (e) are laterally aligned with the holes of the third consecutive step (e).

23. The method of claim 21, wherein the offsets are configured such that the holes of step (e) are laterally aligned with the holes of the fourth consecutive step (e).

24. The method of claim 21, wherein the offsets are configured such that the holes of step (e) are laterally aligned with the holes of the second consecutive step (e).

25. The method of claim 14, wherein said holes have a generally hexagonal cross section.

26. The method of claim 14, wherein said holes have a generally square cross section.

27. The method of claim 14, wherein said holes have a generally circular cross section.

28. The method of claim 14, wherein said multi-layered structure comprises a plurality of stacked first and second two-dimensionally periodic slabs arranged in an alternating sequence, said first two-dimensionally periodic slabs comprising lower dielectric rods surrounded by higher dielectric material, said second two-dimensionally periodic slabs comprising higher dielectric rods surrounded by lower dielectric material, said rods of said first or second two-dimensionally periodic slabs being laterally offset from the rods of a nearest consecutive two-dimensionally periodic slab of the same type.

29. The method of claim 14, wherein at least one of said two-dimensionally periodic array of holes includes a defect.

* * * * *